United States Patent
Lal et al.

(10) Patent No.: US 12,106,659 B2
(45) Date of Patent: Oct. 1, 2024

(54) HAPTICS SIGNAL GENERATION

(71) Applicant: Cirrus Logic International Semiconductor Ltd., Edinburgh (GB)

(72) Inventors: Anil Lal, Hounslow (GB); Michael Kurek, Austin, TX (US); Hamid Sepehr, London (GB)

(73) Assignee: Cirrus Logic Inc., Austin, TX (US)

( * ) Notice: Subject to any disclaimer, the term of this patent is extended or adjusted under 35 U.S.C. 154(b) by 244 days.

(21) Appl. No.: 17/542,571

(22) Filed: Dec. 6, 2021

(65) Prior Publication Data
US 2023/0059333 A1    Feb. 23, 2023

Related U.S. Application Data

(60) Provisional application No. 63/234,559, filed on Aug. 18, 2021.

(51) Int. Cl.
G08B 6/00        (2006.01)

(52) U.S. Cl.
CPC .................... G08B 6/00 (2013.01)

(58) Field of Classification Search
CPC .......... G08B 6/00; H01H 13/85; G06F 3/016; G06F 1/1613; H10N 30/857; H10N 30/503; H10N 30/206; H10N 30/063
See application file for complete search history.

(56) References Cited

U.S. PATENT DOCUMENTS

| | | | |
|---|---|---|---|
| 2007/0236449 A1* | 10/2007 | Lacroix | G06F 3/016 345/156 |
| 2014/0176415 A1 | 6/2014 | Buuck et al. | |
| 2014/0340209 A1 | 11/2014 | Lacroix et al. | |
| 2018/0300651 A1 | 10/2018 | Knott et al. | |
| 2019/0378383 A1 | 12/2019 | Buttner et al. | |
| 2021/0110841 A1 | 4/2021 | Weber et al. | |
| 2021/0150865 A1 | 5/2021 | Valanarasu et al. | |

FOREIGN PATENT DOCUMENTS

| | | | | |
|---|---|---|---|---|
| CN | 208924498 U | * | 5/2019 | |
| CN | 213818156 U | * | 7/2021 | |
| EP | 0328352 A2 | * | 2/1989 | ........... B06B 1/0253 |
| EP | 2963836 A1 | * | 1/2016 | ........... H04B 1/7143 |
| JP | 2003533258 A | * | 5/2001 | |

OTHER PUBLICATIONS

Examination Report under Section 18(3), UKIPO, Application No. GB2211270.0, mailed Oct. 9, 2023.
Combined Search and Examination Report under Sections 17 and 18(3), UKIPO, Application No. GB2211270.0, dated Mar. 2, 2023.
Combined Search and Examination Report under Sections 17 and 18(3), UKIPO, Application No. GB2401753.5, mailed Mar. 27, 2024.

* cited by examiner

Primary Examiner — Quan Zhen Wang
Assistant Examiner — Mancil Littlejohn, Jr.
(74) Attorney, Agent, or Firm — Jackson Walker L.L.P.

(57) ABSTRACT

A haptics signal generator configured to generate a haptics signal for driving a haptics transducer by amplitude modulating and frequency modulating a carrier signal based on an input audio signal.

17 Claims, 11 Drawing Sheets

HAPTICS SIGNAL GENERATION

The present disclosure claims priority to U.S. Provisional Patent Application Ser. No. 63/234,559, filed Aug. 18, 2021, which is incorporated by reference herein in its entirety.

FIELD OF DISCLOSURE

The present disclosure relates in general to the generation of a haptics signal for driving a haptics transducer, based on an input signal such as an audio signal, and in particular to a haptics signal generator and corresponding methods, systems, computer programs and computer-readable storage media.

BACKGROUND

As is well known, haptics (or haptic) technology creates an experience of touch, or a tactile experience, by applying forces, vibrations, or motions to a user.

Haptics effects may be used to enhance a user experience in areas such as gaming or mobile phone ringtones, by applying a driving waveform to a haptics transducer such as an LRA or other vibrational transducer such as a piezoelectric transducer. In general, forces may be applied to the user to give a haptic experience (also referred to as haptic feedback) which accompanies and/or enhances another user experience, such as an audio or visual experience, or which merely provides a user with tactile information concerning the status of an ongoing process. For example, a haptics transducer may be driven at the same time as a speaker and/or visual display so that an audio experience (e.g. listening to a music track) or an audio-visual experience (e.g. watching a film sequence or playing a video game) is enhanced by a haptics experience.

Haptics effects may be provided by a host device, which may also provide an accompanying experience such as an audio or audio-visual experience as mentioned above. A host device may be considered a haptics-enabled device (a device enabled with haptics technology) where it is provided with an LRA (linear resonant actuator) or other haptics output transducer which is driven to apply forces directly or indirectly (e.g. via a touchscreen) to a user. In this context, a host device may be considered an electrical or electronic device and may be a mobile device. Example devices include a portable and/or battery powered host device such as a mobile telephone or smartphone, an audio player, a video player, a PDA, a mobile computing platform such as a laptop computer or tablet and/or a games device.

Complex haptics effects are typically composed offline and stored as haptics signal sequences in memory. When required, the sequences are retrieved from memory and used to drive a haptics transducer. Haptics signals may be generated from audio data (Audio-to-Haptics) as an alternative to offline composition. Different amplitude envelopes of the audio signal may be used to amplitude modulate a carrier signal at the resonant frequency f0 of the associated haptics transducer. However, the resultant haptics signals have been found to provide a limited or lack-lustre user experience.

It is desirable to address some or all of the above problems. It is desirable to provide an improved technique for haptics signal generation.

SUMMARY

According to a first aspect of the present disclosure, there is provided a haptics signal generator configured to generate a haptics signal (haptics output signal) for driving a haptics transducer by amplitude modulating and frequency modulating a carrier signal based on an input signal.

According to a second aspect of the present disclosure, there is provided a haptics signal generator configured to generate a haptics signal for driving a haptics transducer by bandwidth modulating a carrier signal based on an input signal.

According to a third aspect of the present disclosure, there is provided a haptics signal generator configured to generate a haptics signal for driving a haptics transducer by frequency modulating a carrier signal based on an input signal.

According to a fourth aspect of the present disclosure, there is provided a haptics signal generator configured to generate a haptics signal for driving a haptics transducer by frequency modulating and bandwidth modulating a carrier signal based on an input signal.

According to a fifth aspect of the present disclosure, there is provided a haptics signal generator configured to generate a haptics signal for driving a haptics transducer by frequency modulating a carrier signal based on an input signal, wherein the haptics signal generator is configured to control and/or limit a frequency bandwidth or a peak modulation frequency deviation of the haptics signal based on one or more of: a resonant frequency of the haptics transducer; a predetermined threshold value or a configuration parameter; a Q factor of the haptics transducer; one or more harmonic frequencies of the haptics transducer or peaks in a frequency response of the haptics transducer; and a Q factor of a resonant frequency or one or more harmonic frequencies of the haptics transducer or peaks in a frequency response of the haptics transducer.

With reference to the first to fifth aspects, haptics signals may be generated in an improved manner. In the case of frequency modulation, frequency information (or other information) present in the input signal (e.g. a dominant pitch frequency, in the case of an input audio signal) may be embedded (by frequency modulation) in a frequency of oscillation (in frequency) of e.g. the centre frequency of the haptics signal. In the case of bandwidth control/limitation, the bandwidth of the haptics signal (or a frequency range over which the centre frequency of the haptics signal oscillates) may be controlled or limited to enable embedded information to be conveyed to (or perceived by) the user even when using high Q (quality factor)/narrow bandwidth haptics transducers. In the case of bandwidth modulation, information present in the input signal may be embedded (by bandwidth modulation) in the bandwidth of the haptics signal (or a frequency range over which e.g. the centre frequency of the haptics signal oscillates). In the case of amplitude modulation, information present in the input signal may be embedded (by amplitude modulation) in the amplitude of the haptics signal. Such techniques enable the production of complex haptics effects in real-time or on-the-fly.

According to a sixth aspect of the present disclosure, there is provided a haptics system, comprising: the haptics signal generator according to any of the preceding aspects; and said haptics transducer.

According to a seventh aspect of the present disclosure, there is provided a host device comprising the haptics signal generator according to any of the first to fifth aspects or the haptics system according to the sixth.

Also envisaged are corresponding method aspects, computer program aspects and storage medium aspects. Features of one aspect may be applied to another and vice versa.

BRIEF DESCRIPTION OF THE DRAWINGS

Reference will now be made, by way of example only, to the accompanying drawings, of which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
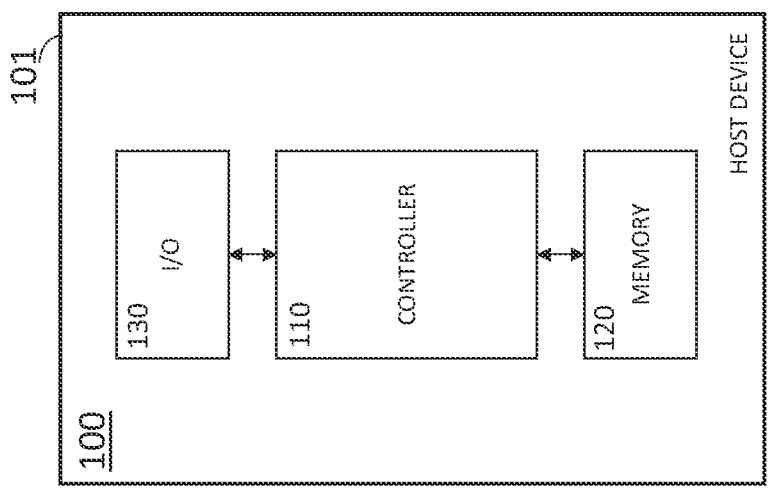
FIG. 1 is a schematic diagram of a host device according to an embodiment.

FIG. 1 is a schematic diagram of a host device 100 according to an embodiment, for example a mobile or portable electrical or electronic device. Example host devices 100 include a portable and/or battery powered host device such as a mobile telephone, a smartphone, an audio player, a video player, a PDA, a mobile computing platform such as a laptop computer or tablet and/or a games device.

As shown in FIG. 1, the host device 100 may comprise an enclosure 101, a controller 110, a memory 120, and an input and/or output unit (I/O unit) 130.

The enclosure 101 may comprise any suitable housing, casing, chassis or other enclosure for housing the various components of host device 100. Enclosure 101 may be constructed from plastic, metal, and/or any other suitable materials. In addition, enclosure 101 may in some arrangements be adapted (e.g., sized and shaped) such that host device 100 is readily transported by a user (i.e. a person).

Controller 110 may be housed within enclosure 101 and may include any system, device, or apparatus configured to control functionality of the host device 100, including any or all of the memory 120, and the I/O unit 130. Controller 110 may be implemented as digital or analogue circuitry, in hardware or in software running on a processor, or in any combination of these.

Thus controller 110 may include any system, device, or apparatus configured to interpret and/or execute program instructions or code and/or process data, and may include, without limitation a processor, microprocessor, microcontroller, digital signal processor (DSP), application specific integrated circuit (ASIC), FPGA (Field Programmable Gate Array) or any other digital or analogue circuitry configured to interpret and/or execute program instructions and/or process data. Thus the code may comprise program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware. Processor control code for execution by the controller 110, may be provided on a non-volatile carrier medium such as a disk, CD- or DVD-ROM, programmed memory such as read only memory (Firmware), or on a data carrier such as an optical or electrical signal carrier. The controller 110 may be referred to as control circuitry and may be provided as, or as part of, an integrated circuit such as an IC chip.

Memory 120 may be housed within enclosure 101, may be communicatively coupled to controller 110, and may include any system, device, or apparatus configured to retain program instructions and/or data for a period of time (e.g., computer-readable media). In some embodiments, controller 110 interprets and/or executes program instructions and/or processes data stored in memory 120 and/or other computer-readable media accessible to controller 110.

The I/O unit 130 may be housed within enclosure 101, may be distributed across the host device 100 (i.e. it may represent a plurality of units) and may be communicatively coupled to the controller 110. Although not specifically shown in FIG. 1, the I/O unit 130 comprises an LRA (or other haptics transducer), i.e. a device capable of outputting a force, such as a vibration. The I/O unit 130 may (in addition) comprise any or all of a microphone, a radio (or other electromagnetic) transmitter/receiver, a speaker, a display screen (optionally a touchscreen), an indicator (such as an LED), a sensor (e.g. force sensor, accelerometer, temperature sensor, gyroscope, camera, tilt sensor, electronic compass, etc.) and one or more buttons or keys. Example force sensors include or comprise capacitive displacement sensors, inductive force sensors, strain gauges, piezoelectric force sensors, force sensing resistors (resistive force sensors), piezoresistive force sensors, thin film force sensors and quantum tunnelling composite-based force sensors.

With the presence of the LRA (as an example haptics transducer), the host device 100 may be considered a haptics-enabled device. Some aspects of the present disclosure, for example the controller 110, may be arranged as part of a haptics circuit, for instance a haptics circuit which may be provided in the host device 100. A circuit or circuitry embodying aspects of the present disclosure (such as the controller 110) may be implemented (at least in part) as an integrated circuit (IC), for example on an IC chip. One or more input or output transducers (such as a force sensor or an LRA) may be connected to the integrated circuit in use.

By way of overview, the present disclosure considers a technique for on-the-fly or real-time haptics signal generation. The resultant haptics signals may be considered comparable to or preferable to pre-composed immersive, content-rich haptics signals. The disclosed techniques allow for haptics feedback based on an input signal, such as an audio signal. Thus, for an audio signal, the haptics feedback may be provided for any content that contains audio data. By basing the haptics feedback on the input signal, the limitation of haptics feedback for pre-composed content only is relieved.

The disclosed techniques consider embedding information from the input signal in the frequency content (e.g. centre/dominant frequency and/or bandwidth) of the haptics signal, by generating the haptics signal by frequency and/or bandwidth modulating a carrier signal (which may be a single-tone signal).

For example, in the case of an input audio signal, audio frequency information (or other information) present in the input audio signal (e.g. a dominant pitch frequency) may be embedded (by frequency modulation) in a frequency of oscillation (in frequency) of the centre frequency of the haptics signal. The bandwidth of the haptics signal (or a frequency range over which the centre frequency of the haptics signal oscillates) may be controlled or limited to enable the embedded information to be conveyed to (or perceived by) the user even when using high Q (quality factor)/narrow bandwidth haptics transducers.

As another example, in the case of an input audio signal, information present in the input audio signal may be embedded (by bandwidth modulation) in the bandwidth of the haptics signal (or a frequency range over which the centre frequency of the haptics signal oscillates).

Figure 2:
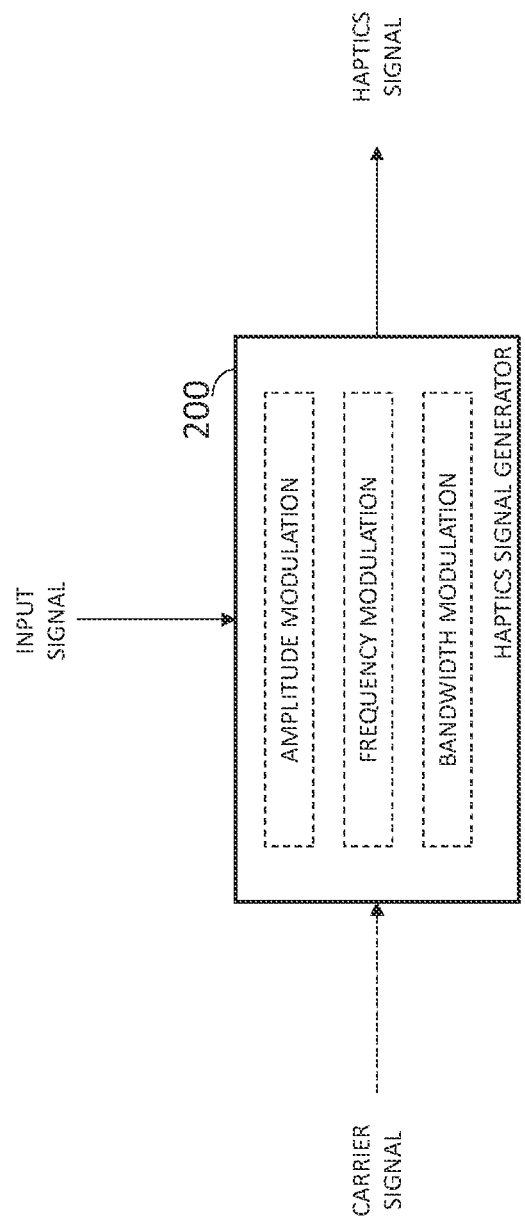
FIG. 2 is a schematic diagram of a haptics signal generator according to an embodiment.
Figure 3:
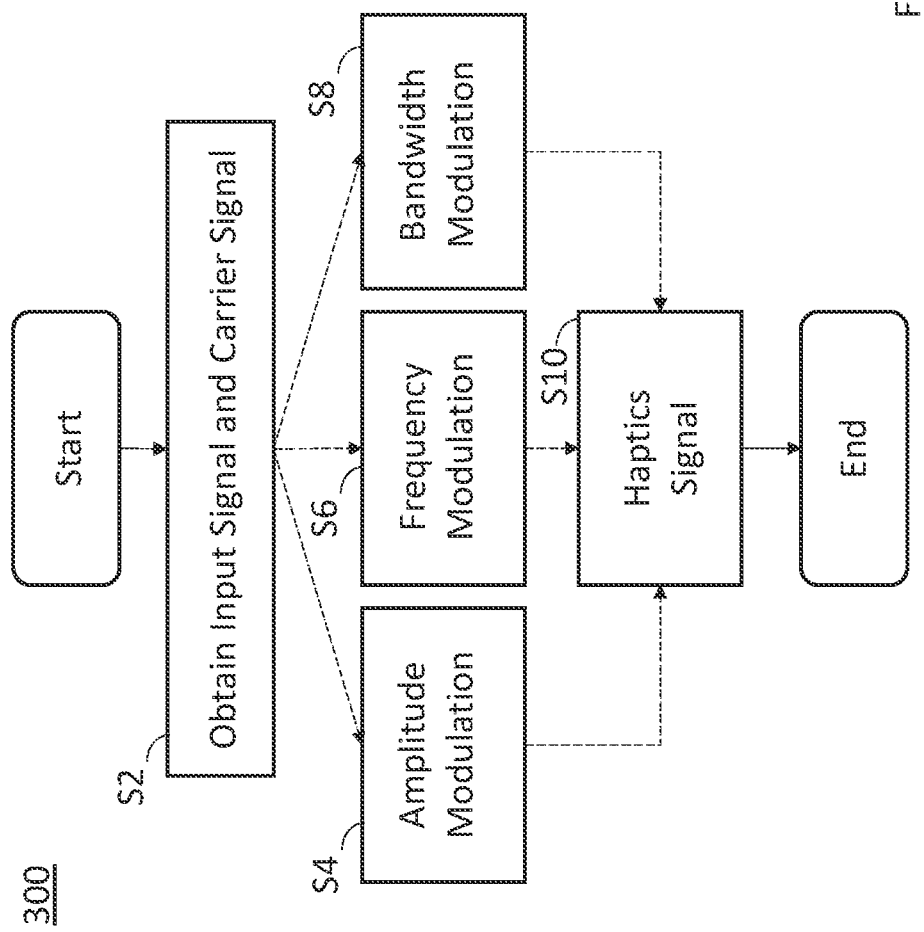
FIG. 3 is a flowchart presenting a method according to an embodiment.

FIG. 2 is a schematic diagram of an example haptics signal generator (haptics signal generation circuit or circuitry) 200. The haptics signal generator 200 may be implemented by the controller 110 of the host device 100. FIG. 3 is a flowchart presenting a method 300 corresponding to the operation of the haptics signal generator 200.

As above for the controller 110, the haptics signal generator 200 may be implemented in any combination of hardware and software. For example, the haptics signal generator 200 may be implemented as a computer program, which may be provided on a computer-readable storage medium.

With reference to FIGS. 2 and 3, the haptics signal generator 200 is configured to generate a haptics signal (haptics output signal) for driving a haptics transducer (not shown) by at least one of (or any two of, or all of) amplitude modulating (step S4), frequency modulating (step S6) and bandwidth modulating (step S8) a carrier signal, based on an input signal. The input signal and carrier signal are obtained in step S2, and in step S10 the haptics signal is output based on at least one of steps S4, S6 and S8.

Although method 300 is presented as a series of steps for convenience, the steps may be viewed as being carried out continuously for continuous or ongoing (i.e. real time) output of the haptics signal, with the arrows showing dependency relationships rather than a sequence order. The haptics signal is effectively generated in real time based on the input signal, with time-varying modulation of one or more of amplitude, frequency and bandwidth.

In a running example, the input signal may be understood to be or to comprise an input audio signal, i.e. to be a (digital or analogue) signal which comprises or conveys audio content. However, in other arrangements other types of input signal may be employed. Also, although the input signal may appear as a single signal in FIG. 2, it may in some arrangements be a composite signal comprising a plurality of component signals. Thus, the input signal may be taken to be or to comprise an audio signal, a video signal, an audio-visual signal, an ultrasonic signal, an electromagnetic signal, a biometric signal, a synthetic signal (e.g. generated by a video game) and/or a sensor signal (e.g. generated by a microphone or force sensor). The input signal may for example comprise multiple signals of the same type (e.g. multiple audio signals) or multiple signals of different types (e.g. an audio signal and a video signal) or a combination of these (e.g. multiple audio signals and a video signal).

The component signals of a composite signal may be provided together as a combined single signal (e.g. by multiplexing) or in parallel or independent channels. Thus, a composite signal may be interpreted as a plurality or group of (component) signals in some arrangements.

The different types of modulation considered herein may be based on any one or more of such component signals. For example, amplitude modulation may be based on one such component signal and frequency modulation may be based on the same component signal or on another such component signal. As another example, frequency modulation may be based on one such component signal and bandwidth modulation may be based on the same component signal or on another such component signal. Any one such type of modulation may be based on any one or more of such component signals. Thus, references to aspects of the input signal may be taken as references to aspects of any one or more such component signals.

Figure 4:
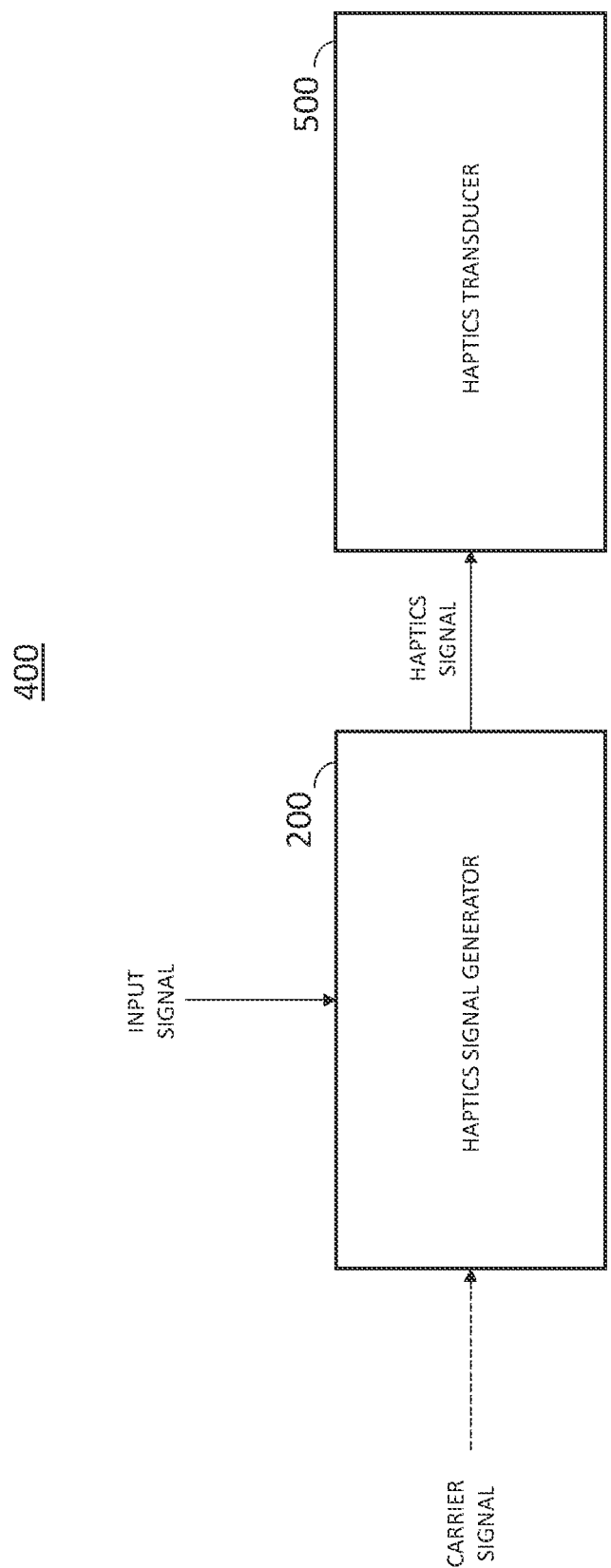
FIG. 4 is a schematic diagram of a haptics system according to an embodiment.

For context, FIG. 4 is a schematic diagram of a haptics system 400, comprising the haptics signal generator 200 and a haptics transducer 500. The haptics signal generated by the haptics signal generator 200 is used to drive the haptics transducer 500. As before, the haptics signal generator 200 may be implemented by the controller 110 of the host device 100. The haptics transducer 500 may be implemented as part of the I/O unit 130 of the host device 100. Thus, the haptics system 400 may be implemented as (or in) the host device 100.

Returning to FIG. 2, in the running example the haptics signal generator 200 is configured to generate the haptics signal by at least amplitude modulating and frequency modulating the carrier signal based on the input signal. Nevertheless, in FIG. 2 the amplitude modulation, frequency modulation and bandwidth modulation functions are shown in dashed boxes to indicate that in some arrangements not all of them (and even only one or any two of them) may be provided.

As mentioned earlier, the carrier signal may be a single tone signal having a carrier frequency fc. Where the frequency modulation does not involve a wholesale frequency shift (e.g., up-conversion or down-conversion), the centre frequency fh of the eventual haptics signal may fluctuate around the carrier frequency fc. The carrier frequency fc may be selected in this case such that it is substantially the same as or within a defined range of the resonant frequency f0 of the haptics transducer or another frequency peak fp in its frequency response, optionally being a harmonic of the resonant frequency f0. Where frequency up-conversion or down-conversion is involved, the carrier frequency fc may be selected accordingly based on the intended frequency shift and the resonant frequency f0 or other frequency peak fp of the haptics transducer.

In the running example, therefore, certain information content of the input signal (for example as represented by the amplitude or magnitude of the input signal, or a signal derived therefrom) is represented in the amplitude of the haptics signal. Similarly, certain information content of the input signal (for example as represented in the frequency content of the input signal, or a signal derived therefrom) is represented in the frequency content of the haptics signal. In the case of an input audio signal, as in the present example, a dominant pitch in the input signal may be represented in a frequency component of the haptics signal. For example, a dominant pitch in the input signal may be represented in a frequency at which a frequency component of the haptics signal (such as a dominant frequency peak of the haptics signal or a centre frequency fh of the haptics signal or a frequency peak of the haptics signal corresponding to a carrier frequency fc of the carrier signal) oscillates in frequency.

Where bandwidth modulation is carried out, certain information content of the input signal (for example as represented by an amplitude envelope of the input signal or a signal derived therefrom, or by a rate of change of that envelope) may be represented in the bandwidth of the haptics signal. For example, a peak frequency deviation (peak modulation frequency deviation) of the haptics signal may be controlled by this modulation, where the peak frequency deviation is a maximum deviation of the centre frequency fh of the haptics signal from the carrier frequency fc. An envelope of an oscillating signal may be taken here to be a (smooth) curve outlining or following its extremes, e.g., its peaks or its troughs.

Figure 5:
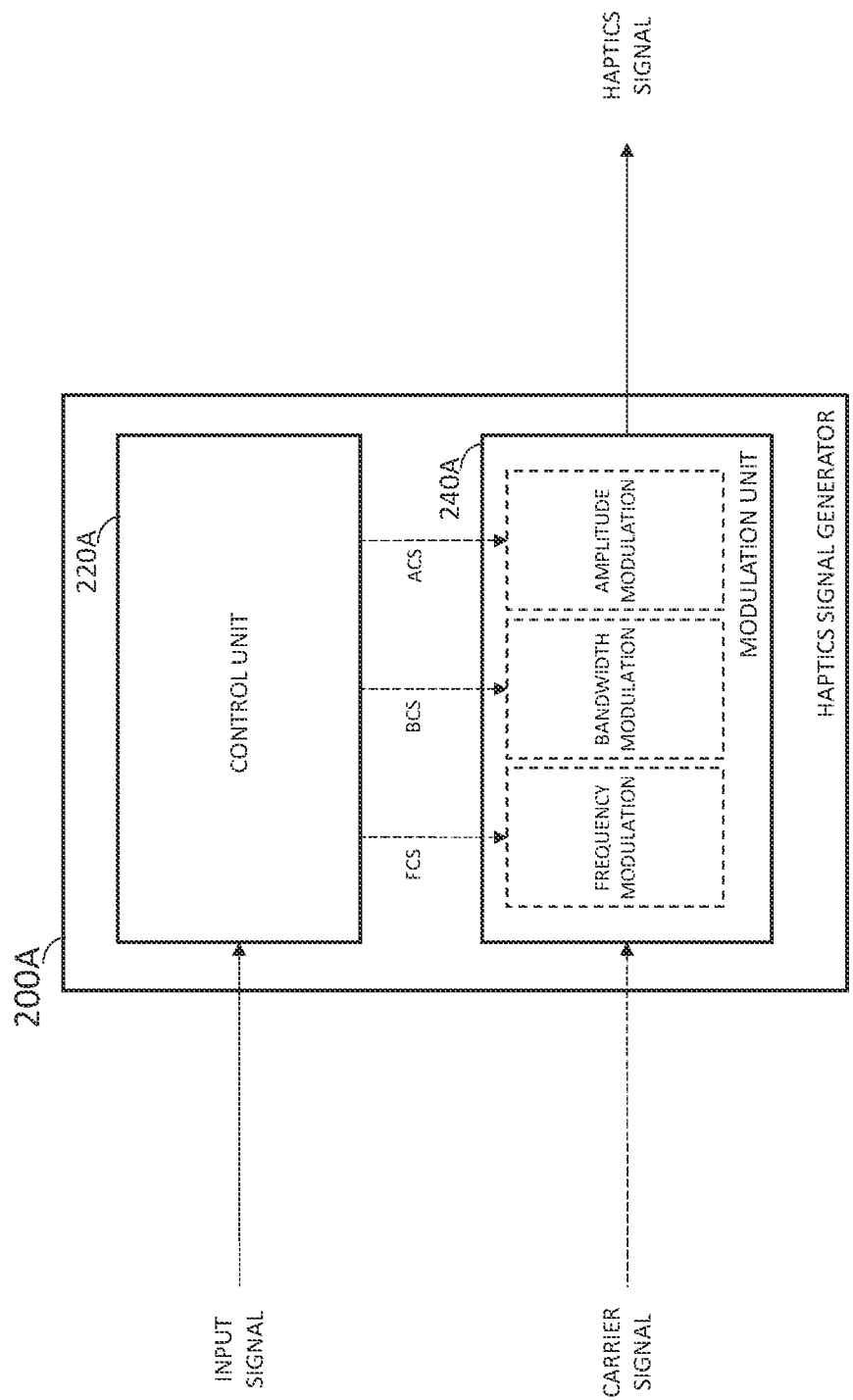
FIG. 5 is a schematic diagram of a haptics signal generator according to an embodiment.

FIG. 5 is a schematic diagram of an example haptics signal generator 200A, being an example detailed implementation of the haptics signal generator 200. The haptics signal generator 200A may be implemented by the controller 110 of the host device 100.

The haptics signal generator 200A comprises a control unit 220A and a modulation unit 240A. The control unit 220A is configured to generate one or more of a frequency-control signal FCS, a bandwidth-control signal BCS and an amplitude-control signal ACS, corresponding to the amplitude modulation, frequency modulation and bandwidth modulation functions, respectively. The modulation unit 240A is configured to receive the carrier signal and carry out one or more of the amplitude modulation, frequency modulation and bandwidth modulation functions, based on the corresponding control signals, to generate the haptics signal.

In the running example, where both amplitude and frequency modulation are employed, both the frequency-control signal FCS and the amplitude-control signal ACS are provided. As before, however, in FIG. 5 the amplitude modulation, frequency modulation and bandwidth modulation functions are shown using dashed boxes and arrows to indicate that in some arrangements not all of them may be provided.

Focussing first on frequency (or phase or angle) modulation, the haptics signal generator 200A (or more particularly the control unit 220A) may be configured to generate the frequency-control signal FCS based on the input signal (or one or more component signals thereof). The haptics signal generator 200A (or more particularly the modulation unit 240A) may be configured to frequency modulate the carrier signal based on the frequency-control signal FCS.

The frequency-control signal FCS may be generated so that its magnitude is a function of (generated from, based on or proportional to) any of a set of aspects of the input signal or a signal derived therefrom.

The set of aspects may include a characteristic or dominant frequency or phase or a dominant pitch frequency of the input signal or a signal derived therefrom. For example, the input signal or the signal derived therefrom may be filtered or analysed to identify a dominant frequency peak or a dominant pitch frequency. The filtering or analysis, in the case of an audio signal, may focus on the audible frequency range of the user, for example about 20 Hz to 20 kHz for humans. As another example, the set of aspects may include a frequency or phase of defined features, characteristics or portions of the input signal or a signal derived therefrom, which again may be identified by filtering or other spectrum analysis. For example, particular features or characteristics (e.g. dominant tones) may be identified in or extracted from the input signal or a signal derived therefrom, by filtering or e.g. spectrum analysis. Examples of such features, characteristics or portions may include (particularly considering the example audio signal) transients or events such as "clicks", "bumps", "buzzes", "pulses" or events such as gunshots, sharp note onsets, hi-hats/snare drum hits etc.

The set of aspects may include: an amplitude or magnitude or envelope of the input signal or a signal derived therefrom, or a rate of change thereof; an amplitude or magnitude or envelope of defined or extracted features, characteristics or portions of the input signal or a signal derived therefrom, or a rate of change thereof; and an amplitude or magnitude or envelope of a combined signal, or a rate of change thereof, the combined signal generated by combining amplitudes or magnitudes or envelopes of defined or extracted features, characteristics or portions of the input signal or a signal derived therefrom.

The set of aspects may include a frequency bandwidth of the input signal, or a signal derived therefrom.

The haptics signal generator 200A (or more particularly the modulation unit 240A) may be configured to frequency modulate the carrier signal based on the frequency-control signal FCS so that a frequency component of the haptics signal (such as a dominant frequency peak of the haptics signal or a centre frequency fh of the haptics signal or a frequency peak of the haptics signal corresponding to a carrier frequency fc of the carrier signal) is a function of a magnitude of the frequency-control signal FCS, and/or oscillates in frequency at a frequency defined by a magnitude of the frequency-control signal FCS. The haptics signal generator 200A (or more particularly the modulation unit 240A) may be configured to frequency modulate the carrier signal based on the frequency-control signal FCS so that a frequency component of the haptics signal (as above) oscillates in frequency over a frequency bandwidth defined by a configuration parameter.

Given the possible high Q (quality factor) nature of the haptics transducer, the haptics signal generator 200A (or 200) may be configured to control and/or limit (constrain) a frequency bandwidth or a peak frequency deviation (peak modulation frequency deviation) of the haptics signal based on one or more of: (1) a resonant frequency of the haptics transducer; (2) a predetermined threshold value or a configuration parameter; (3) a Q factor of the haptics transducer; (4) one or more harmonic frequencies of the haptics transducer or peaks in a frequency response of the haptics transducer; and (5) a Q factor of a resonant frequency or one or more harmonic frequencies of the haptics transducer or peaks in a frequency response of the haptics transducer.

The carrier signal and/or the haptics signal may be a narrowband signal.

Focussing second on bandwidth modulation, the haptics signal generator 200A may be configured to bandwidth modulate the carrier signal based on the input signal (or one or more component signals thereof). Specifically, the haptics signal generator 200A (or more particularly the control unit 220A) may be configured to generate the bandwidth-control signal BCS based on the input signal. The haptics signal generator 200A (or more particularly the modulation unit 240A) may be configured to bandwidth modulate the carrier signal based on the bandwidth-control signal BCS. For example, the haptics signal generator 200A (or more particularly the modulation unit 240A) may be configured to control a peak frequency deviation (peak modulation frequency deviation) of the haptics signal based on the bandwidth-control signal BCS. As before, the peak frequency deviation (peak modulation frequency deviation) may be understood as a maximum deviation of the centre frequency (or dominant frequency peak) fh of the haptics signal from the carrier frequency fc of the carrier signal.

The bandwidth-control signal BCS may be generated so that its magnitude is a function of (generated from, based on or proportional to) any of the set of aspects of the input signal or a signal derived therefrom as mentioned earlier.

The haptics signal generator 200A (or more particularly the modulation unit 240A) may be configured to bandwidth modulate and/or frequency modulate the carrier signal based on the bandwidth-control signal BCS so that a frequency bandwidth or the peak frequency deviation (peak modulation frequency deviation) of the haptics signal is a function of a magnitude of the bandwidth-control signal BCS. The haptics signal generator 200A (or more particularly the modulation unit 240A) may be configured to bandwidth modulate and/or frequency modulate the carrier signal based on the bandwidth-control signal BCS so that a frequency component of the haptics signal, such as a dominant frequency peak of the haptics signal or a centre frequency fh of the haptics signal or a frequency peak of the haptics signal corresponding to a carrier frequency fc of the carrier signal, oscillates in frequency over a frequency bandwidth defined by a magnitude of the bandwidth-control signal BCS.

Focussing third on amplitude modulation, the haptics signal generator 200A (or more particularly the control unit 220A) may be configured to generate the amplitude-control signal ACS based on the input signal (or one or more component signals thereof). The haptics signal generator 200A (or more particularly the modulation unit 240A) may be configured to amplitude modulate the carrier signal based on the amplitude-control signal ACS.

The amplitude-control signal ACS may be generated so that its magnitude is a function of (generated from, based on or proportional to) any of the set of aspects of the input signal or a signal derived therefrom as mentioned earlier.

The haptics signal generator 200A (or more particularly the modulation unit 240A) may be configured to amplitude modulate the carrier signal based on the amplitude-control signal ACS so that an amplitude of the haptics signal is a function of a magnitude of the amplitude-control signal ACS.

As indicated in FIGS. 2 and 5, the carrier signal may be provided to the haptics signal generator 200 or 200A from an external source. However, this is optional as indicated by the associated dashed arrow; the haptics signal generator 200 or 200A may be configured to generate the carrier signal internally.

It is recalled that the input signal may be a composite signal and may be or comprise an audio signal, a video signal, an ultrasonic signal, an electromagnetic signal, a biometric signal, a synthetic signal (e.g. generated by a video game) and/or a sensor signal (e.g. generated by a microphone or force sensor). For ease of understanding, however, a detailed example arrangement will now be considered in connection with FIGS. 6 to 10 where the input signal is a (single) audio signal.

Figure 6:
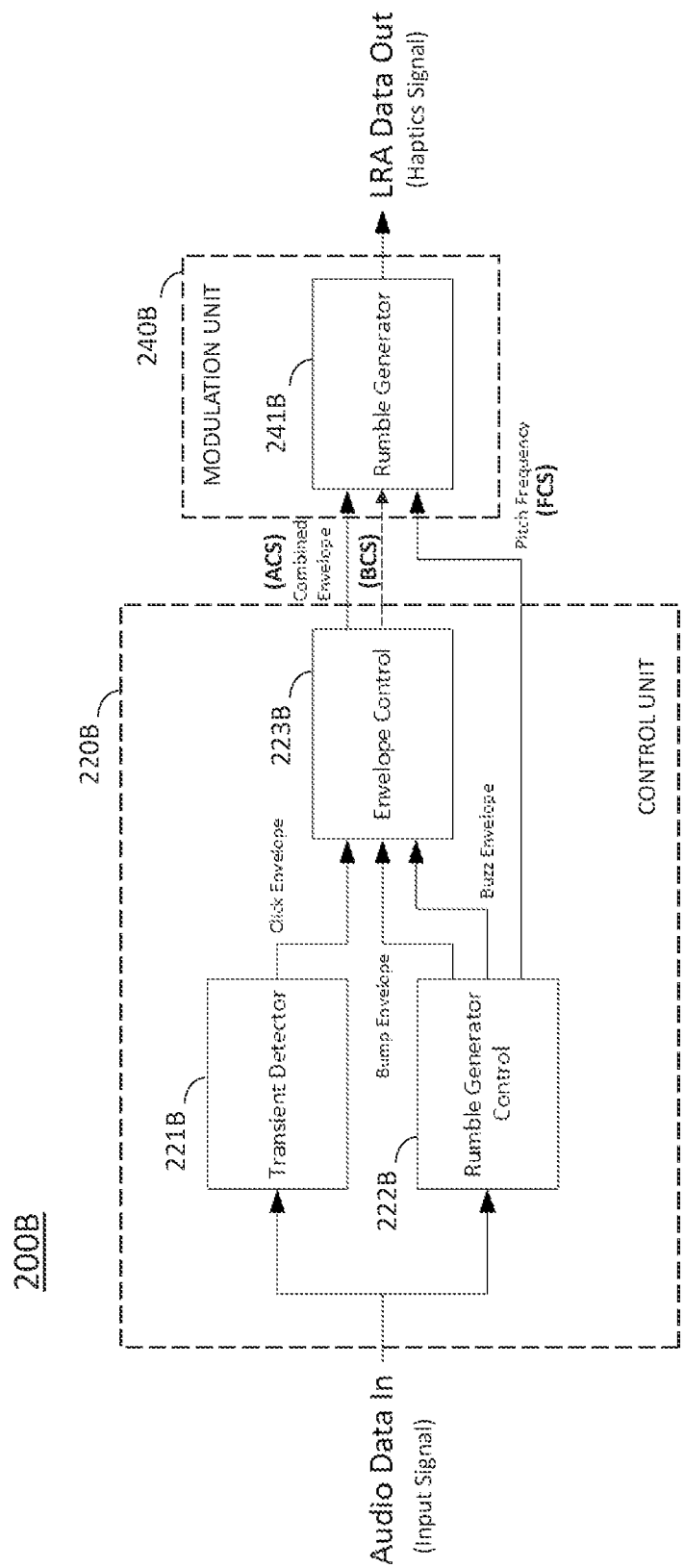
FIG. 6 is a schematic diagram of a haptics signal generator according to an embodiment.

FIG. 6 is a schematic diagram of an example haptics signal generator 200B, being an example detailed implementation of the haptics signal generator 200A. The haptics signal generator 200B may be implemented by the controller 110 of the host device 100.

The haptics signal generator 200B comprises a control unit 220B and a modulation unit 240B, corresponding respectively to the control unit 220A and modulation unit 240A.

As shown, the control unit 220B is configured to receive an Audio Data In signal, being an audio signal as an example input signal, and to generate a Pitch Frequency signal as an example frequency-control signal FCS, and a Combined Envelope signal as an example amplitude-control signal ACS. As an example, the control unit 220B is also shown generating an example bandwidth-control signal BCS.

The control unit 220B comprises (as units or modules) a Transient Detector 221B, a Rumble Generator Control unit 222B and an Envelope Control unit 223B. The Transient Detector 221B is configured to generate a Click Envelope signal based on the Audio Data In signal. The Rumble Generator Control unit 222B is configured to generate a Bump Envelope signal, a Buzz Envelope signal and a Pitch Frequency signal (as an example FCS) based on the Audio Data In signal. The Envelope Control unit 223B is configured to generate the Combined Envelope signal (as an example ACS) based on the Click Envelope, Bump Envelope and Buzz Envelope signals. The Envelope Control unit 223B is also optionally configured to generate an example BCS based on one or more of the Click Envelope, Bump Envelope and Buzz Envelope signals. This operation will be considered in more detail later.

The modulation unit 240B is configured to generate its own carrier signal (not shown) and to carry out amplitude modulation based on the Combined Envelope signal (as an example ACS) and frequency modulation based on the Pitch Frequency signal (as an example FCS), and optionally also based on an example BCS, to generate the LRA Data Out signal (as an example haptics signal). The main functionality of the modulation unit 240B is shown as carried out by a Rumble Generator 241B. Again, this operation will be considered in more detail later.

Before considering detailed functionality, in this example arrangement audio input signal characteristics are used to generate the haptics signal. As such, the haptics signal generator 200B may be referred to as an Audio-to-Haptics device. The control unit 220B generates amplitude envelopes based on features and events in the Audio Data In signal, preferably using various envelope detectors to arrive at the Combined Envelope signal as amplitude information extracted from the Audio Data In signal. Frequency information is also extracted from the Audio Data In signal to generate the Pitch Frequency signal. The modulation unit 240B, principally the Rumble Generator 241B, uses the amplitude and frequency information to generate the LRA Data Out signal (haptics signal).

The Rumble Generator 241B (unit or module) generates the haptics signal (LRA Data Out) using the envelope and pitch frequency information. The envelope input (Combined Envelope) may directly control the amplitude envelope of the haptics output signal (LRA Data Out). The haptics output signal frequency (which may be user configurable) may be approximately at the haptics transducer resonant frequency f0 or at another frequency peak fp in a frequency response of the haptics transducer, optionally being a harmonic of the resonant frequency f0. The resonant frequency of the haptics transducer need not be determined through calibration, allowing for some variation in resonant frequency due to part-to-part variation or drive voltage variations. Pitch information extracted from the input signal (Audio Data In) may be embedded in the haptics output signal (LRA Data Out). The system may thus be configured to convey frequency information even for low bandwidth/high Q haptics transducers where f»f0 and f«f0 acceleration response is low. For example, the bandwidth of the haptics output signal (LRA Data Out) may be constrained by parameter settings.

An example detailed implementation of the units/modules of FIG. 6 will now be considered in connection with FIGS. 7 to 10.

In this example, the Transient Detector 221B and Rumble Generator Control unit 222B generate 'Click', 'Bump' and 'Buzz' envelope signals, with the Envelope Control unit 223B then applying automatic gain control (AGC) and limiting to those envelope signals, and then merging or combining them into a signal combined envelope signal, i.e., the Combined Envelope signal.

Figure 7:
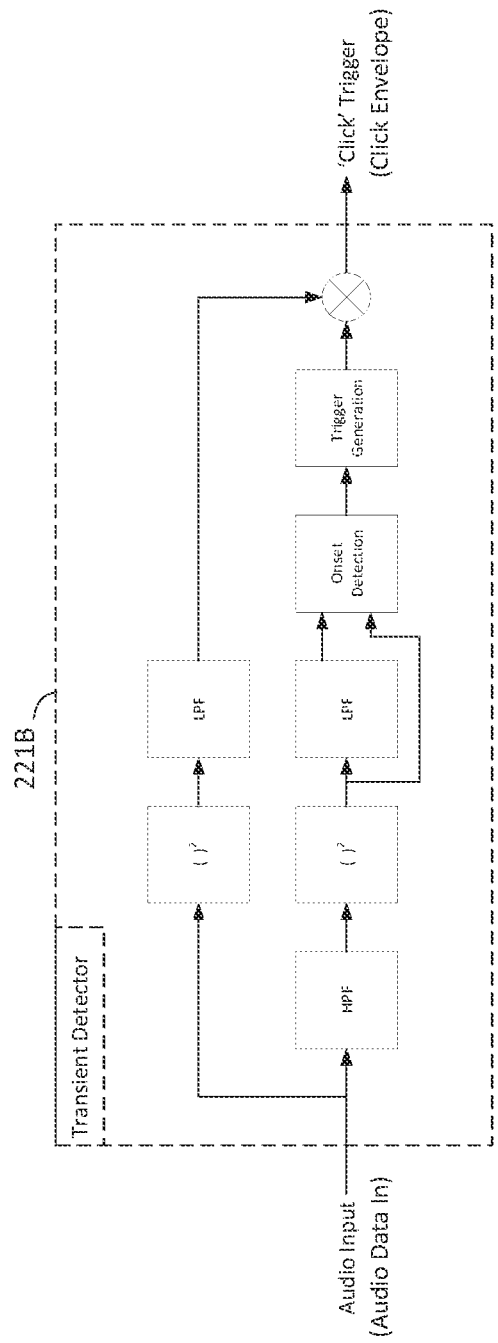
FIG. 7 is a schematic diagram presenting example functionality of the Transient Detector of FIG. 6.

FIG. 7 is a schematic diagram presenting example functionality of the Transient Detector 221B, for detecting transients in the input audio signal, Audio Data In. As such, it is designed to detect events such as gunshots, sharp note onsets, hi-hats/snare drum hits etc. A short pulse envelope (which may be user configurable) is generated for detected transient events and is referred to as the Click Envelope signal.

Looking at the lower branch in FIG. 7, an onset detection signal γ_smoothed [n] is calculated as follows by comparing an instantaneous signal envelope (based on a high pass filter or HPF) to low pass filter (LPF) envelope and smoothing:

$$x\_instantaneous\ [n] = HPF\{x[n]\}^2$$

$$\gamma[n] = (x\_instantaneous\ [n])/(HPF\{x\_instantaneous\ [n]\})$$

$$\gamma\_smoothed\ [n] = a\gamma\_smoothed\ [n-1] + (1-a)\gamma[n]$$

where n is the sample (or time step) number, x_instantaneous [n] corresponds to samples of the input audio signal Audio Data In, HPF and LPF are high pass filter and low pass filter functions, respectively, and a is a smoothing parameter.

A trigger signal τ_raw [n] is generated by thresholding the onset detection signal:

$$\tau\_raw\ [n] = 1\ \text{if}\ \gamma\_smoothed\ [n] > \theta$$

$$\tau\_raw\ [n] = 0\ \text{if}\ \gamma\_smoothed\ [n] \leq \theta$$

where θ is a parameter.

Looking at the upper branch in FIG. 7, a full-band envelope signal G[n] is generated by squaring the input signal and applying an LPF function to the result:

$$G[n] = LPF\{x[n]^2\}$$

Where the upper and lower branches meet, an output click trigger signal τ[n], serving as the Click Envelope signal, is generated by multiplying the full-band envelope signal G[n] by τ_raw [n]:

$$\tau[n] = G[n] \cdot \tau\_raw\ [n]$$

Figure 8A:
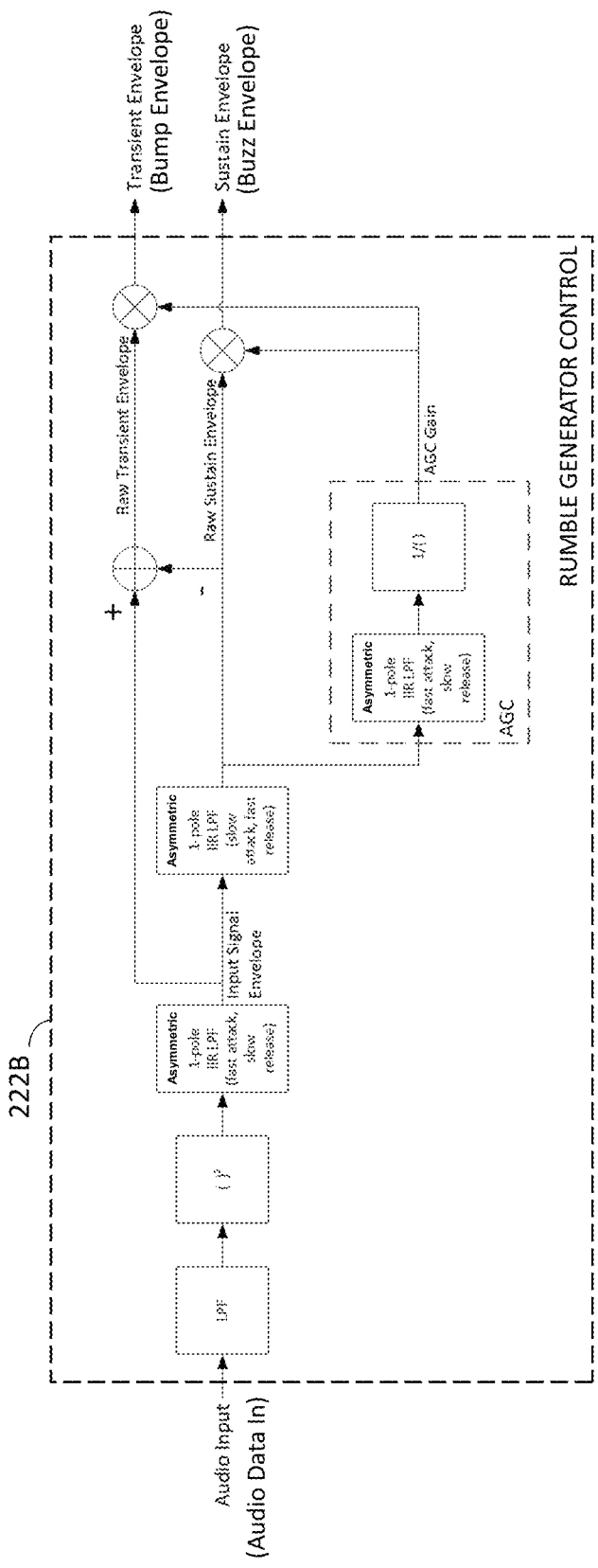
FIGS. 8A and 8B are schematic diagrams together presenting example functionality of the Rumble Generator Control unit of FIG. 6.
Figure 8B:
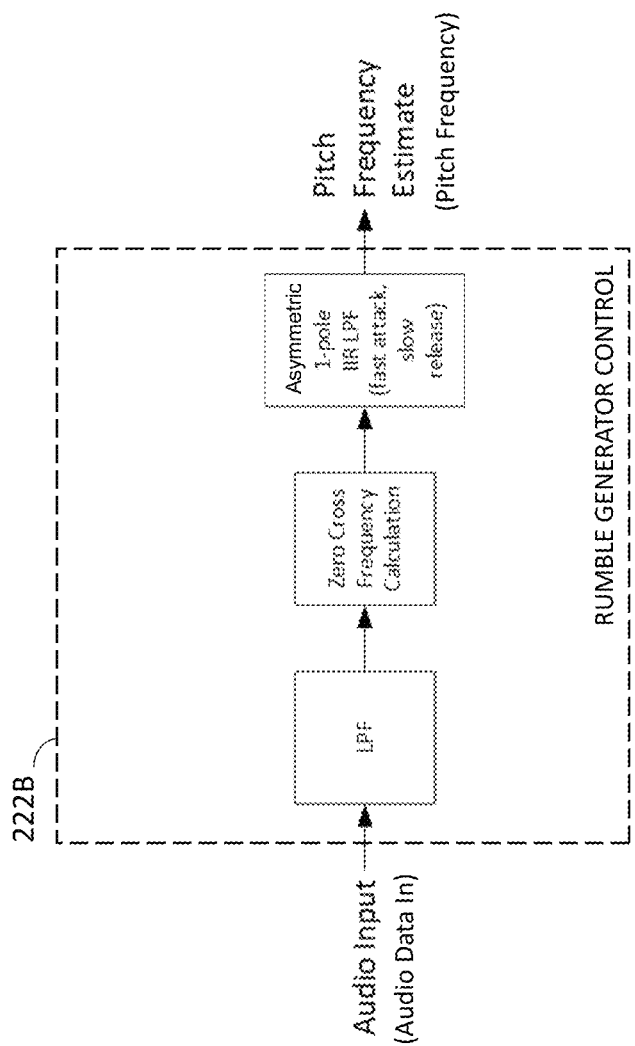

FIGS. 8A and 8B are schematic diagrams together presenting example functionality of the Rumble Generator Control unit 222B.

Focusing first on FIG. 8A, the Rumble Generator Control unit 222B is configured to generate a 'buzz' amplitude envelope signal (Buzz Envelope) which follows sustained elements of low frequency audio signal (such as bass notes in music, engine noise in gaming, explosion rumble, thunder rumble). The Rumble Generator Control unit 222B is also configured to generate a 'bump' amplitude envelope signal (Bump Envelope) which follows transient segments of low frequency audio signal (i.e. not sharp transients, which are captured by the Transient Detector 221B). Effectively, the 'bump' amplitude envelope signal (Bump Envelope) is generated for slower transients e.g., the initial impact of explosions or kick drums. The Rumble Generator Control unit 222B is also configured to extract the dominant pitch frequency from low frequency audio signal as described later in connection with FIG. 8B.

An instantaneous energy E[n] of low frequency input is calculated using:

$$E[n] = LPF\{x[n]\}^2$$

An input signal envelope signal $y_{ISE}[n]$ (Input Signal Envelope) may be calculated using E[n] and smoothed using an asymmetric 1-pole IIR LPF:

$$y_{ISE}[n] = a\ y_{ISE}[n-1] + (1-a)E[n]$$

$$a = a\_attack1\ \text{if}\ E[n] > y_{ISsE}[n-1]$$

$$a = a\_release1\ \text{if}\ E[n] \leq yhd\ ISE[n-1]$$

where a_attack1 and a_release1 are parameters which may be tuned for fast attack, slow release.

The input signal envelope signal $y_{ISE}[n]$ (Input Signal Envelope) may be used to generate raw transient and sustain envelope signals, i.e. Raw Transient Envelope and Raw Sustain Envelope, respectively.

The raw sustain envelope signal, which may be referred to as $y_{RSE}[n]$, is extracted from the input signal envelope signal $y_{ISE}[n]$ by using an asymmetric 1-pole IIR LPF:

$$y_{RSE}[n] = a\ y_{RSE}[n-1] + (1-a)\ y_{ISE}[n]$$

$$a = a\_attack2\ \text{if}\ y_{ISE}[n] > y_{RSE}[n-1]$$

$$a = a\_release2\ \text{if}\ y_{ISE}[n] \leq y_{RSE}[n-1]$$

where a_attack2 and a_release2 are parameters which may be tuned for slow attack, fast release.

The raw transient envelope signal (Raw Transient Envelope) is extracted from the input signal envelope signal (Input Signal Envelope) by subtracting the raw sustain envelope signal $y_{RSE}[n]$ (Raw Sustain Envelope) from the input signal envelope signal $y_{ISE}[n]$ (Input Signal Envelope), or otherwise determining the difference between envelopes.

An automatic gain control (AGC) gain signal (AGC Gain) is generated by first tracking the raw sustain envelope signal $y_{RSE}[n]$ (Raw Sustain Envelope) peak. The peak is tracked using an asymmetric 1-pole IIR LPF:

$$y_{AGC}[n] = ay_{AGC}[n-1] + (1-a)\ y_{RSE}[n]$$

$$a = a\_attack3\ \text{if}\ y_{RSE}[n] > y_{RSE}[n-1]$$

$$a = a\_release3\ \text{if}\ y_{RSE}[n] \leq y_{AGC}[n-1]$$

where a_attack3 and a_release3 are parameters which may be tuned for fast attack, slow release.

The peak may be normalized to unity by taking the reciprocal of the tracked peak. The AGC Gain signal (following normalization) may then be applied to the raw transient and raw sustain envelope signals to produce Transient Envelope and Sustain Envelope signals, respectively. The Transient Envelope and Sustain Envelope signals correspond to the Bump Envelope and Buzz Envelope signals, respectively.

Turning to FIG. 8B, the Rumble Generator Control unit 222B is also configured to detect rising zero crosses of LPF of the input audio signal Audio Data In, x[n]:

$$LPF\{x[n-1]\} \leq 0\ \text{and}\ LPF\{x[n]\} > 0$$

Rising zero crosses give raw signal period T from which the raw frequency f is calculated, $y_f[n]$.

The raw frequency $y_f[n]$ may be smoothed to generate a smoothed raw frequency $y_{fs}[n]$ using an asymmetric 1-pole IIR LPF:

$$y_{fs}[n]=ay_{fs}[n-1]+(1-a)\,y_f[n]$$

$$a=a\_\text{attack4 if } y_f[n]>y_{fs}[n-1]$$

$$a=a\_\text{release4 if } y_f[n]\leq y_{fs}[n-1]$$

where a_attack4 and a_release4 are parameters which may be tuned for slow attack, fast release.

Figure 9:
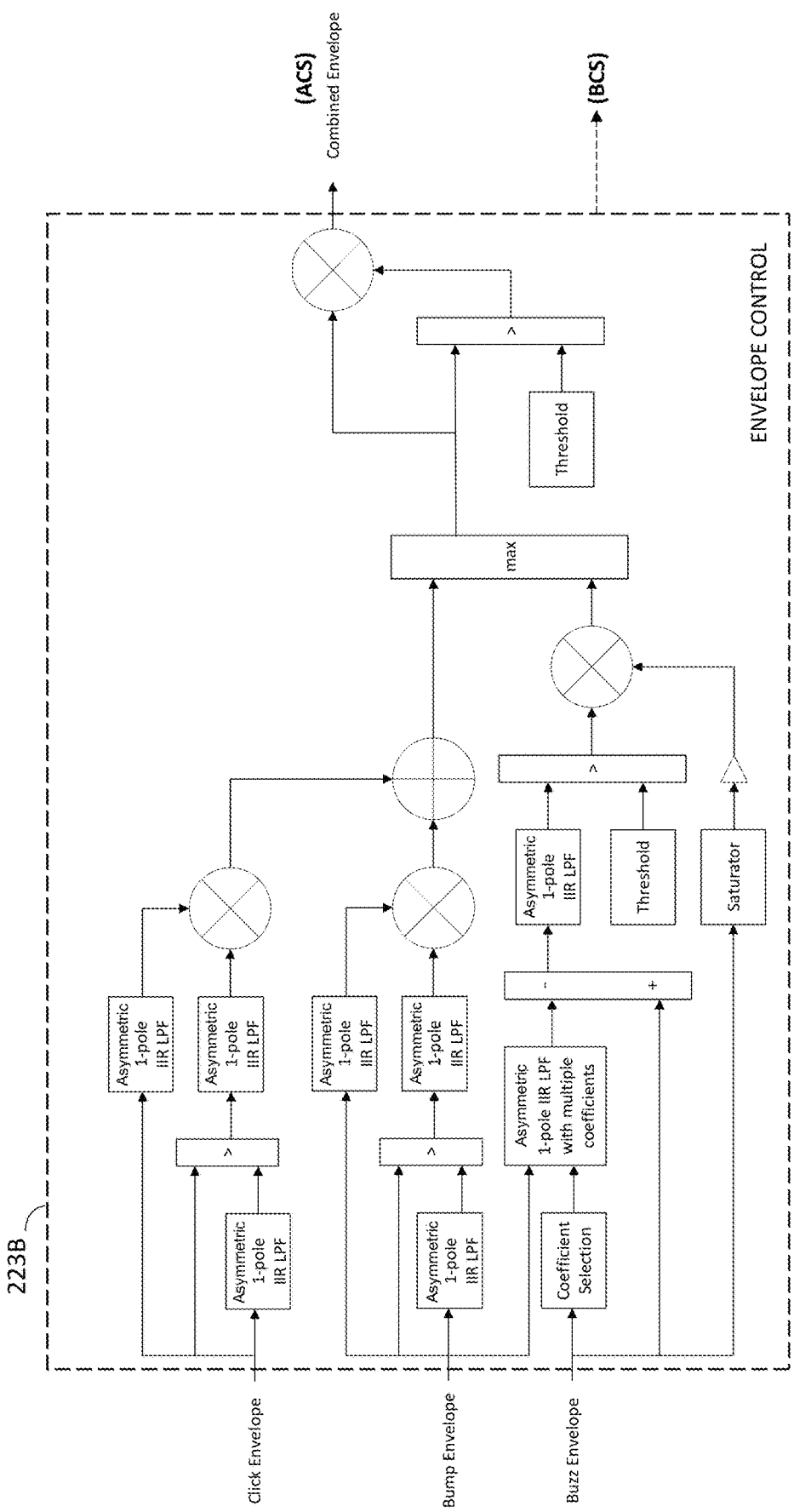
FIG. 9 is a schematic diagram presenting example functionality of the Envelope Control unit of FIG. 6.

FIG. 9 is a schematic diagram presenting example functionality of the Envelope Control unit 223B. As may be appreciated from FIG. 9, the Envelope Control unit 223B applies filters to the different envelopes (Click Envelope, Bump Envelope and Buzz Envelope) along with suitable thresholds, before combining the different envelopes into the single Combined Envelope signal (as an example ACS). Undesired envelopes may be disabled in the combining process automatically (e.g. using appropriate thresholds and/or saturators).

As an example, the Combined Envelope signal may be created by taking the maximum value of all envelopes at each time step, for example based on:

env_combined[$n$]=max{env_click[$n$], env_bump[$n$], env_buzz[$n$]} where:
n is the digital or discrete time step number,
env_click[n] is the Click Envelope signal at time step n,
env_bump[n] is the Bump Envelope signal at time step n,
env_buzz[n] is the Buzz Envelope signal at time step n,
env_combined[n] is the Combined Envelope signal at time step n, and
max{ . . . } is a maximum function.

Although not shown in detail, it will be appreciated that an optional bandwidth-control signal BCS could also be generated based on one or more of the different envelopes (Click Envelope, Bump Envelope, Buzz Envelope, Combined Envelope) so that a magnitude of the bandwidth-control signal BCS is related to e.g. a magnitude or rate of change of such an envelope.

Figure 10:
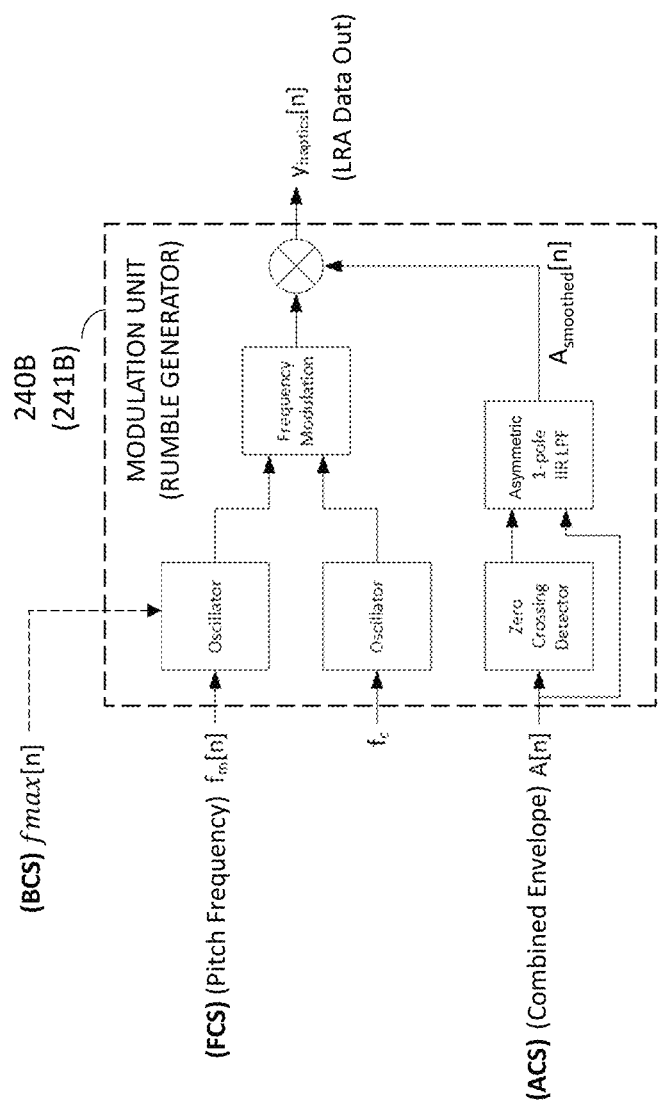
FIG. 10 is a schematic diagram presenting example functionality of the Rumble Generator of FIG. 6.

FIG. 10 is a schematic diagram presenting example functionality of the Rumble Generator 241B. In this example, the Rumble Generator 241B comprises a sine wave oscillator at frequency fc (i.e. which generates the carrier signal) which is frequency modulated by a $2^{nd}$ sine wave oscillator at a time varying frequency fm[n] to produce a full-scale, frequency modulated output signal $y_{FM}[n]$. Here, fc is the 'carrier' frequency (i.e. a frequency setting) tuned to approx. the resonant frequency f0 of the haptics transducer as mentioned earlier, and fm[n] is the time-varying haptics frequency to be embedded in the 'carrier' signal (and is the same as the smoothed raw frequency $y_{fs}[n]$, i.e. the Pitch Frequency signal). It is recalled that fc may be tuned to approx. another frequency peak fp of the haptics transducer as mentioned earlier.

Merely as an example, the $2^{nd}$ sine wave oscillator (the upper oscillator in FIG. 10) is shown receiving a signal fmax[n] as an example BCS to enable bandwidth modulation in addition to the frequency modulation, this effectively controlling the amplitude of the output of that oscillator. Where bandwidth modulation is not provided, the fmax[n] signal may be replaced with a non-variable signal or simple parameter setting (e.g. internal to the Rumble Generator 241B) and represented below as fmax rather than fmax[n].

The full-scale, frequency modulated output signal $y_{FM}[n]$ is then amplitude modulated by a smoothed input amplitude envelope signal $A_{smoothed}[n]$ to generate the haptics signal $y_{haptics}[n]$, i.e. LRA Data Out.

In this example, the full-scale, frequency modulated output signal $y_{FM}[n]$ (the output of the Frequency Modulation block in FIG. 10) at time step n is calculated as:

$$\Delta\phi_m[n]=(2\pi f_m[n])/fs$$

$$\phi_m[n]=\phi_m[n-1]+\Delta\phi_m[n]$$

$$x_m[n]=\sin(\phi_m[n])$$

$$kT[n]=(2\pi f_{max}[n])/fs$$

$$\Delta\phi_{mod}[n]=kT[n]\cdot x_m[n]$$

$$\Delta\phi_c=(2\pi fc)/fs$$

$$\Delta\phi_{yFM}[n]=\Delta\phi_{mod}[n]+\Delta\phi_c$$

$$\phi_{yFM}[n]=\phi_{yFM}[n-1]+\Delta\phi_{yFM}[n]$$

$$y_{FM}[n]=\sin(\phi_{yFM}[n])$$

where:
n is the digital or discrete time step (or sample) number,
$\Delta\phi_m[n]$ is the change of phase of the modulating signal (the output of the upper oscillator in FIG. 10) between time steps at time step n,
$\phi_m[n]$ is the phase of modulating signal at time step n,
$x_m[n]$ is the modulating signal with unity amplitude at time step n,
kT[n] is the peak amplitude of the modulating signal,
fmax[n] is the maximum or peak modulation frequency deviation at time step n,
fs is the sampling frequency,
$\Delta\phi_{mod}[n]$ is the modulation phase change between time steps at time step n,
$\Delta\phi_c$ is the phase change between time steps of the carrier signal (corresponding to the output of the lower oscillator in FIG. 10),
fc is the carrier frequency,
$\Delta\phi_{yFM}[n]$ is the change of phase between time steps at time step n of the full-scale, frequency modulated output signal $y_{FM}[n]$, and
$\phi_{yFM}[n]$ is the phase at time step n of the full-scale, frequency modulated output signal $y_{FM}[n]$.

The input amplitude envelope signal A[n] (Combined Envelope) is smoothed using a 1-pole IIR LPF:

$$A_{smoothed}[n]=aA_{smoothed}[n-1]+(1-a)A[n]$$

where:
If at a zero cross, apply no smoothing (a_zc=0)

$$a=a\_zc \text{ if } x[n-1]\leq 0 \text{ and } x[n]>0$$

At non-zero crossings apply smoothing (a_nzc≠0)

a=a_nzc otherwise

The haptics output signal $y_{haptics}[n]$ (LRA Data Out) is then generated by multiplying the full-scale, frequency modulated signal $y_{FM}[n]$ by the smoothed amplitude envelope $A_{smoothed}[n]$:

$$y_{haptics}[n]=A_{smoothed}[n]\cdot y_{FM}[n]$$

Looking back over FIGS. 6 to 10, the method of generating the haptics output signal for driving a haptics transducer may be summarised as comprising the steps of: receiving an audio signal (as an example input signal), and based on the audio signal: extracting the audio pitch frequency, extracting at least one amplitude envelope related to a haptic effect; providing a narrowband (carrier) signal around e.g. f0 of a haptics transducer to be driven, and based on the narrowband signal: frequency modulating the signal based on the audio pitch frequency; amplitude modulating the signal based on the at least one envelope; and generating a haptics output signal to drive a haptics transducer from the frequency- and amplitude-modulated signal. Bandwidth modulation has also been considered.

The skilled person will recognise that some aspects of the above-described apparatus (circuitry) and methods may be embodied as processor control code, for example on a non-volatile carrier medium such as a disk, CD- or DVD-ROM, programmed memory such as read only memory (Firmware), or on a data carrier such as an optical or electrical signal carrier. For example, the haptics signal generator 200, 200A or 200B may be implemented as a processor operating based on processor control code. As another example, the controller 110 may be implemented as a processor operating based on processor control code.

For some applications, such aspects will be implemented on a DSP (Digital Signal Processor), ASIC (Application Specific Integrated Circuit) or FPGA (Field Programmable Gate Array). Thus the code may comprise conventional program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog TM or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware.

Some embodiments of the present invention may be arranged as part of an audio processing circuit, for instance an audio circuit (such as a codec or the like) which may be provided in a host device as discussed above. A circuit or circuitry according to an embodiment of the present invention may be implemented (at least in part) as an integrated circuit (IC), for example on an IC chip. One or more input or output transducers (such as an LRA) may be connected to the integrated circuit in use.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office (USPTO) and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The present disclosure extends to the following statements:

S1. A haptics signal generator configured to generate a haptics signal (haptics output signal) for driving a haptics transducer by amplitude modulating and frequency modulating a carrier signal based on an input signal.

S2. The haptics signal generator according to statement 51, configured to:
  generate a frequency-control signal based on the input signal; and frequency modulate the carrier signal based on the frequency-control signal.

S3. The haptics signal generator according to statement S2, configured to generate the frequency-control signal so that its magnitude is a function of (generated from, based on or proportional to):
- a characteristic or dominant (e.g. largest) frequency or phase or a dominant pitch frequency (e.g. a frequency peak, optionally within a given frequency range or band, such as an audio band) of the input signal or a signal derived therefrom; and/or
- a frequency or phase of defined features, characteristics or portions of the input signal or a signal derived therefrom; and/or
- an amplitude or magnitude or envelope of the input signal or a signal derived therefrom, or a rate of change thereof; and/or
- an amplitude or magnitude or envelope of defined or extracted features, characteristics or portions of the input signal or a signal derived therefrom, or a rate of change thereof; and/or
- an amplitude or magnitude or envelope of a combined signal, or a rate of change thereof, the combined signal generated by combining amplitudes or magnitudes or envelopes of defined or extracted features, characteristics or portions of the input signal or a signal derived therefrom; and/or
- a frequency bandwidth of the input signal or a signal derived therefrom.

S4. The haptics signal generator according to statement S2 or S3, configured to frequency modulate the carrier signal based on the frequency-control signal so that:
- a frequency component of the haptics signal, such as a dominant (e.g. characteristic or largest) frequency peak of the haptics signal (e.g. within a given frequency range or band) or a centre frequency fh of the haptics signal or a frequency peak of the haptics signal corresponding to a carrier frequency fc of the carrier signal, is a function of a magnitude of the frequency-control signal; and/or
- a frequency component of the haptics signal, such as a dominant frequency peak of the haptics signal or a centre frequency fh of the haptics signal or a frequency peak of the haptics signal corresponding to a carrier frequency fc of the carrier signal, oscillates in frequency at a frequency defined by a magnitude of the frequency-control signal; and/or
- a frequency component of the haptics signal, such as a dominant frequency peak of the haptics signal or a centre frequency fh of the haptics signal or a frequency peak of the haptics signal corresponding to a carrier frequency fc of the carrier signal, oscillates in frequency over a frequency bandwidth defined by a configuration parameter.

S5. The haptics signal generator according to any of the preceding statements, configured to control and/or limit a frequency bandwidth or a peak modulation frequency deviation of the haptics signal based on one or more of:
- a resonant frequency of the haptics transducer;
- a predetermined threshold value or a configuration parameter;
- a Q factor of the haptics transducer;
- one or more harmonic frequencies of the haptics transducer or peaks in a frequency response of the haptics transducer; and
- a Q factor of a resonant frequency or one or more harmonic frequencies of the haptics transducer or peaks in a frequency response of the haptics transducer.

S6. The haptics signal generator according to any of the preceding statements, configured to bandwidth modulate the carrier signal based on the input signal.

S7. The haptics signal generator according to any of the preceding statements, configured to:
- generate a bandwidth-control signal based on the input signal; and
- bandwidth modulate the carrier signal based on the bandwidth-control signal.

S8. The haptics signal generator according to statement S7, wherein bandwidth modulating the carrier signal comprises controlling a peak modulation frequency deviation of the haptics signal based on the bandwidth-control signal,
- optionally wherein the peak modulation frequency deviation is a maximum deviation of a centre frequency fh of the haptics signal from a carrier frequency fc of the carrier signal.

S9. The haptics signal generator according to statement S7 or S8, configured to generate the bandwidth-control signal so that its magnitude is a function of:
- a characteristic or dominant frequency or phase or a dominant pitch frequency of the input signal or a signal derived therefrom; and/or
- a frequency or phase of defined features, characteristics or portions of the input signal or a signal derived therefrom; and/or
- an amplitude or magnitude or envelope of the input signal or a signal derived therefrom, or a rate of change thereof; and/or
- an amplitude or magnitude or envelope of defined or extracted features, characteristics or portions of the input signal or a signal derived therefrom, or a rate of change thereof; and/or
- an amplitude or magnitude or envelope of a combined signal, or a rate of change thereof, the combined signal generated by combining amplitudes or magnitudes or envelopes of defined or extracted features, characteristics or portions of the input signal or a signal derived therefrom; and/or
- a frequency bandwidth of the input signal or a signal derived therefrom.

S10. The haptics signal generator according to statement S7, S8 or S9, configured to bandwidth modulate and/or frequency modulate the carrier signal based on the bandwidth-control signal so that:
- a frequency bandwidth or a peak modulation frequency deviation of the haptics signal is a function of a magnitude of the bandwidth-control signal; and/or
- a frequency component of the haptics signal, such as a dominant frequency peak of the haptics signal or a centre frequency fh of the haptics signal or a frequency peak of the haptics signal corresponding to a carrier frequency fc of the carrier signal, oscillates in frequency over a frequency bandwidth defined by a magnitude of the bandwidth-control signal.

S11. The haptics signal generator according to any of the preceding statements, configured to:
- generate an amplitude-control signal based on the input signal; and
- amplitude modulate the carrier signal based on the amplitude-control signal.

S12. The haptics signal generator according to statement S11, configured to generate the amplitude-control signal so that its magnitude is a function of:
- a characteristic or dominant frequency or phase or a dominant pitch frequency of the input signal or a signal derived therefrom; and/or a frequency or phase of defined features, characteristics or portions of the input signal or a signal derived therefrom; and/or an amplitude or magnitude or envelope of the input signal or a signal derived therefrom, or a rate of change thereof; and/or an amplitude or magnitude or envelope of defined or extracted features, characteristics or portions of the input signal or a signal derived therefrom, or a rate of change thereof; and/or an amplitude or magnitude or envelope of a combined signal, or a rate of change thereof, the combined signal generated by combining amplitudes or magnitudes or envelopes of defined or extracted features, characteristics or portions of the input signal or a signal derived therefrom; and/or 1 a frequency bandwidth of the input signal or a signal derived therefrom.

S13. The haptics signal generator according to statement S11 or S12, configured to amplitude modulate the carrier signal based on the amplitude-control signal so that an amplitude of the haptics signal is a function of a magnitude of the amplitude-control signal.

S14. The haptics signal generator according to statement S2, S7 or S11, comprising:
a control unit configured to generate the frequency-control signal and/or the amplitude-control signal and/or the amplitude-control signal based on the input signal; and
a modulation unit configured to carry out the modulation of the carrier signal based on the frequency-control signal and/or the amplitude-control signal and/or the amplitude-control signal.

S15. The haptics signal generator according to any of the preceding statements, wherein the input signal is a composite signal comprising a plurality of component signals.

S16. The haptics signal generator according to statement S15, wherein at least one of the component signals is, or comprises, an audio signal, a video signal, an audio-visual signal, an ultrasonic signal, an electromagnetic signal, a biometric signal, a synthetic signal and/or a sensor signal.

S17. The haptics signal generator according to any of the preceding statements, wherein the input signal is, or comprises, an audio signal, a video signal, an audio-visual signal, an ultrasonic signal, an electromagnetic signal, a biometric signal, a synthetic signal and/or a sensor signal.

S18. The haptics signal generator according to any of the preceding statements, wherein:
the haptics transducer has a resonant frequency f0 or another frequency peak fp in its frequency response, optionally being a harmonic of the resonant frequency f0; and
a carrier frequency fc of the carrier signal is substantially the same as or within a predetermined range of the resonant frequency f0 or the frequency peak fp.

S19. The haptics signal generator according to any of the preceding statements, wherein the carrier signal and/or the haptics signal is a narrowband signal.

S20. The haptics signal generator according to any of the preceding statements, wherein the haptics transducer comprises an actuator such as a linear resonant actuator.

S21. The haptics signal generator according to any of the preceding statements, wherein:
the haptics signal generator comprises a carrier signal generator configured to generate the carrier signal; and/or
the carrier signal is a single-tone signal.

S22. A haptics signal generator configured to generate a haptics signal for driving a haptics transducer by bandwidth modulating a carrier signal based on an input signal.

S23. A haptics signal generator configured to generate a haptics signal for driving a haptics transducer by frequency modulating a carrier signal based on an input signal.

S24. A haptics signal generator configured to generate a haptics signal for driving a haptics transducer by frequency modulating and bandwidth modulating a carrier signal based on an input signal.

S25. A haptics signal generator configured to generate a haptics signal for driving a haptics transducer by frequency modulating a carrier signal based on an input signal, wherein the haptics signal generator is configured to control and/or limit a frequency bandwidth or a peak modulation frequency deviation of the haptics signal based on one or more of:
a resonant frequency of the haptics transducer;
a predetermined threshold value or a configuration parameter;
a Q factor of the haptics transducer;
one or more harmonic frequencies of the haptics transducer or peaks in a frequency response of the haptics transducer; and
a Q factor of a resonant frequency or one or more harmonic frequencies of the haptics transducer or peaks in a frequency response of the haptics transducer.

S26. A haptics system, comprising:
the haptics signal generator according to any of the preceding statements; and
said haptics transducer.

S27. A host device comprising the haptics signal generator according to any of statements 51 to S25 or the haptics system according to statement S26.

S28. A method of generating a haptics signal for driving a haptics transducer, the method comprising amplitude modulating and frequency modulating a carrier signal based on an input signal.

S29. A computer program which, when executed by a computer, causes the computer to carry out the method of statement S28.

S30. A computer-readable storage medium having the computer program of statement S29 stored thereon.

Other aspects of the present disclosure include the following statements:

There is described a system and method for generating a haptic output signal comprising:
An input for receiving an audio signal to be output by an audio transducer;
A plurality of envelope generators arranged to generate a plurality of signal envelopes based on different characteristics of the received audio signal;
A combiner to combine the plurality of signal envelopes to provide a combined envelope;
A frequency extractor arranged to extract frequency information from the received audio signal, preferably to extract a dominant pitch frequency from a low frequency portion of the received audio signal; and
A rumble generator arranged to generate a haptic output signal based on the combined envelope and the extracted frequency information.

Preferably, the system and method is configured to output the haptic output signal to an associated haptics transducer, such as a linear resonant actuator (LRA).

Preferably, the rumble generator is arranged to generate a haptic output signal based on a 'carrier' frequency tuned to approximately the resonant frequency of the associated haptics transducer. Further preferably, the rumble generator is arranged to generate a haptic output signal based on a time-varying haptics frequency embedded in the 'carrier' signal.

Preferably, the system and method comprises a transient detector to detect transients in the audio signal. Preferably, the transient detector comprises a short pulse envelope generator to generate a 'click' envelope for transient events in the audio signal. Preferably, the transient detector performs onset detection calculated by comparing an instantaneous signal envelope (based on a high pass filter or HPF) to a low pass filter (LPF) envelope and smoothed.

Preferably, the trigger for a click envelope is generated by thresholding an onset detection signal:

$$\tau\_raw\ [n]=1\ \text{if}\ y\_smoothed\ [n]>\theta$$

$$\tau\_raw\ [n]=0\ \text{if}\ y\_smoothed\ [n]\leq\theta$$

A full-band envelope may be generated by squaring an LPF input signal:

$$G[n]=\text{LPF}\{x[n]^2\}$$

The output click trigger may be generated by multiplying full-band envelope by $$\tau[n]=G[n]\cdot\tau\_raw\ [n]$$

Preferably, the system and method comprises a rumble generator control to generate at least one signal envelope from a low pass portion of the received audio signal.

Preferably, the rumble generator control is arranged to generate a 'buzz' amplitude envelope based on sustained elements of the low frequency audio signal (which may be referred to as the Sustain Envelope).

Preferably, the rumble generator control is arranged to generate a 'bump' amplitude envelope based on transient segments of the low frequency audio signal (which may be referred to as the Transient Envelope).

Preferably, the rumble generator control is arranged to extract a dominant pitch frequency from the low frequency audio signal.

Preferably, the rumble generator control is arranged to detect rising zero crosses of the low frequency audio signal. The rising zero crosses provide a raw signal period T from which the raw frequency f is calculated, preferably using an asymmetric 1-pole IIR LPF.

Preferably, the combiner is provided as part of an envelope controller, which applies filters to the different envelopes along with suitable thresholds. The envelope controller may be arranged to disable undesired envelopes from being combined into the combined envelope. The envelope controller may comprise a plurality of thresholds. The envelope controller may comprise a saturator.

Preferably, the rumble generator generates a haptic output signal using envelope and pitch frequency information. Preferably, the envelope input directly controls the amplitude envelope of the output signal. Preferably, the haptic output signal frequency is approximately at the resonant frequency of an associated haptics transducer. The haptic output signal frequency may be user configurable.

Preferably, there is provided an electronics device, such as a cellphone, laptop, tablet computer or other personal device, comprising the above-described system. There is further provided a controller arranged to implement the above-described system.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A haptics signal generator, the haptics signal generator configured to receive an input audio signal, and to generate a haptics signal for driving a haptics transducer by frequency modulating and bandwidth modulating a carrier signal based on the input audio signal;

wherein the haptics signal generator is configured to:
  generate a frequency-control signal based on the input audio signal;
  frequency modulate the carrier signal based on the frequency-control signal;
  generate a bandwidth-control signal based on the input audio signal; and
  bandwidth modulate the carrier signal based on the bandwidth-control signal;
  wherein bandwidth modulating the carrier signal comprises controlling a peak modulation frequency deviation of the haptics signal based on the bandwidth-control signal.

2. The haptics signal generator as claimed in claim 1, configured to generate the frequency-control signal so that its magnitude is a function of:
  a characteristic or dominant frequency or phase or a dominant pitch frequency of the input audio signal or a signal derived therefrom; and/or
  a frequency or phase of defined features, characteristics or portions of the input audio signal or a signal derived therefrom; and/or
  an amplitude or magnitude or envelope of the input audio signal or a signal derived therefrom, or a rate of change thereof; and/or
  an amplitude or magnitude or envelope of defined or extracted features, characteristics or portions of the input audio signal or a signal derived therefrom, or a rate of change thereof; and/or
  an amplitude or magnitude or envelope of a combined signal, or a rate of change thereof, the combined signal generated by combining amplitudes or magnitudes or envelopes of defined or extracted features, characteristics or portions of the input audio signal or a signal derived therefrom; and/or
  a frequency bandwidth of the input audio signal or a signal derived therefrom.

3. The haptics signal generator as claimed in claim 1, configured to frequency modulate the carrier signal based on the frequency-control signal so that:
  a frequency component of the haptics signal is a function of a magnitude of the frequency-control signal; and/or
  a frequency component of the haptics signal oscillates in frequency at a frequency defined by a magnitude of the frequency-control signal; and/or
  a frequency component of the haptics signal oscillates in frequency over a frequency bandwidth defined by a configuration parameter.

4. The haptics signal generator as claimed in claim 1, configured to control and/or limit a frequency bandwidth or a peak modulation frequency deviation of the haptics signal based on one or more of:
  a resonant frequency of the haptics transducer;
  a predetermined threshold value or a configuration parameter;
  a Q factor of the haptics transducer;
  one or more harmonic frequencies of the haptics transducer or peaks in a frequency response of the haptics transducer; and
  a Q factor of a resonant frequency or one or more harmonic frequencies of the haptics transducer or peaks in a frequency response of the haptics transducer.

5. The haptics signal generator as claimed in claim 1, wherein the peak modulation frequency deviation is a maximum deviation of a centre frequency fh of the haptics signal from a carrier frequency fc of the carrier signal.

6. The haptics signal generator as claimed in claim 1, configured to generate the bandwidth-control signal so that its magnitude is a function of:
  a characteristic or dominant frequency or phase or a dominant pitch frequency of the input audio signal or a signal derived therefrom; and/or
  a frequency or phase of defined features, characteristics or portions of the input audio signal or a signal derived therefrom; and/or
  an amplitude or magnitude or envelope of the input audio signal or a signal derived therefrom, or a rate of change thereof; and/or
  an amplitude or magnitude or envelope of defined or extracted features, characteristics or portions of the input audio signal or a signal derived therefrom, or a rate of change thereof; and/or
  an amplitude or magnitude or envelope of a combined signal, or a rate of change thereof, the combined signal generated by combining amplitudes or magnitudes or envelopes of defined or extracted features, characteristics or portions of the input audio signal or a signal derived therefrom; and/or
  a frequency bandwidth of the input audio signal or a signal derived therefrom.

7. The haptics signal generator as claimed in claim 1, configured to bandwidth modulate and/or frequency modulate the carrier signal based on the bandwidth-control signal so that:
  a frequency bandwidth or a peak modulation frequency deviation of the haptics signal is a function of a magnitude of the bandwidth-control signal; and/or
  a frequency component of the haptics signal oscillates in frequency over a frequency bandwidth defined by a magnitude of the bandwidth-control signal.

8. The haptics signal generator as claimed in claim 1, configured to:
  generate an amplitude-control signal based on the input audio signal; and
  amplitude modulate the carrier signal based on the amplitude-control signal.

9. The haptics signal generator as claimed in claim 8, configured to generate the amplitude-control signal so that its magnitude is a function of:
  an amplitude or magnitude or envelope of the input audio signal or a signal derived therefrom; and/or
  an amplitude or magnitude or envelope of defined or extracted features, characteristics or portions of the input audio signal or a signal derived therefrom; and/or
  an amplitude or magnitude or envelope of a combined signal, the combined signal generated by combining amplitudes or magnitudes or envelopes of defined or extracted features, characteristics or portions of the input audio signal or a signal derived therefrom.

10. The haptics signal generator as claimed in claim 8, configured to amplitude modulate the carrier signal based on the amplitude-control signal so that an amplitude of the haptics signal is a function of a magnitude of the amplitude-control signal.

11. The haptics signal generator as claimed in claim 1, wherein the input audio signal is a composite signal comprising a plurality of component signals.

12. The haptics signal generator as claimed in claim 11, wherein at least one of the component signals is, or comprises, an audio signal, a video signal, an audio-visual signal, an ultrasonic signal, an electromagnetic signal, a biometric signal, a synthetic signal and/or a sensor signal.

13. A haptics system, comprising:
a haptics signal generator; and
a haptics transducer;
wherein:
- the haptics signal generator is configured to receive an input audio signal, and to generate a haptics signal for driving the haptics transducer by frequency modulating and bandwidth modulating a carrier signal based on the input audio signal;
- wherein the haptics signal generator is configured to:
  - generate a frequency-control signal based on the input audio signal;
  - frequency modulate the carrier signal based on the frequency-control signal;
  - generate a bandwidth-control signal based on the input audio signal; and
  - bandwidth modulate the carrier signal based on the bandwidth-control signal;
- wherein bandwidth modulating the carrier signal comprises controlling a peak modulation frequency deviation of the haptics signal based on the bandwidth-control signal.

14. The haptics system as claimed in claim 13, wherein:
the haptics transducer has a resonant frequency f0 or another frequency peak fp in its frequency response; and
a carrier frequency fc of the carrier signal is substantially the same as or within a predetermined range of the resonant frequency f0 or the frequency peak fp.

15. A host device comprising a haptics signal generator, wherein:
- the haptics signal generator is configured to receive an input audio signal, and to generate a haptics signal for driving the haptics transducer by frequency modulating and bandwidth modulating a carrier signal based on the input audio signal;
- wherein the haptics signal generator is configured to:
  - generate a frequency-control signal based on the input audio signal;
  - frequency modulate the carrier signal based on the frequency-control signal;
  - generate a bandwidth-control signal based on the input audio signal; and
  - bandwidth modulate the carrier signal based on the bandwidth-control signal;
- wherein bandwidth modulating the carrier signal comprises controlling a peak modulation frequency deviation of the haptics signal based on the bandwidth-control signal.

16. The haptics signal generator as claimed in claim 3, wherein said frequency component of the haptics signal is a dominant frequency peak of the haptics signal or a centre frequency fh of the haptics signal or a frequency peak of the haptics signal corresponding to a carrier frequency fc of the carrier signal.

17. The haptics signal generator as claimed in claim 7, wherein said frequency component of the haptics signal is a dominant frequency peak of the haptics signal or a centre frequency fh of the haptics signal or a frequency peak of the haptics signal corresponding to a carrier frequency fc of the carrier signal.

* * * * *